United States Patent [19]

Sizer, II

[11] Patent Number: 5,781,625
[45] Date of Patent: Jul. 14, 1998

[54] SYSTEM AND APPARATUS FOR GENERATING WITHIN THE PREMISES A DIAL TONE FOR ENHANCED PHONE SERVICES

[75] Inventor: Theodore Sizer, II, Little Silver, N.J.

[73] Assignee: Lucent Technologies, Inc., Murray Hill, N.J.

[21] Appl. No.: 488,667

[22] Filed: Jun. 8, 1995

[51] Int. Cl.⁶ .......................... H04M 3/00; H04M 1/00; H04N 7/10; H04H 1/00
[52] U.S. Cl. .......................... 379/257; 348/6; 348/552; 370/487; 379/88; 379/114; 379/157; 379/216; 379/353; 379/355; 379/361; 379/387; 455/3.1
[58] Field of Search .................. 379/67, 88, 89, 379/114, 156, 157, 160, 165, 201, 207, 269, 333, 257, 353, 361, 372, 93, 94, 96, 97, 355, 216, 387; 348/552, 6, 12, 13; 455/3.1, 5.1; 370/60.1, 94.1, 110.1, 458, 487

[56] References Cited

U.S. PATENT DOCUMENTS

| | | | |
|---|---|---|---|
| 4,322,581 | 3/1982 | Christain et al. | 379/165 X |
| 4,430,731 | 2/1984 | Gimple et al. | 370/458 X |
| 4,748,656 | 5/1988 | Gibbs et al. | 379/96 X |
| 4,928,302 | 5/1990 | Kaneuchi et al. | 379/355 X |
| 5,359,598 | 10/1994 | Steagall et al. | 379/353 X |

*Primary Examiner*—Harry S. Hong

[57] ABSTRACT

A system and apparatus includes a premises phone connected to a phone network along a first communication channel. A dial tone controller generates within the premises a dial tone along a second communication channel to a switch and to the premises phone. The dial tone controller receives and processes signals received from the premises phone via the switch along the second communication channel and can generate DTMF tones for establishing communication to the phone network based on generated signals received from the premises phone. The switch is operatively connected between the premises phone and the dial tone controller for switching the premises phone from communication with the phone network along the first communication channel and communication with the dial tone controller via the switch along the second communication channel so that the premises phone receives a dial tone from and sends signals to the dial tone controller.

16 Claims, 3 Drawing Sheets

SYSTEM AND APPARATUS FOR GENERATING WITHIN THE PREMISES A DIAL TONE FOR ENHANCED PHONE SERVICES

FIELD OF THE INVENTION

This application relates to a system and apparatus in which a premises controller generates a dial tone to a premises phone for enhanced phone services such as retrieval of phone numbers contained within a database of the dial tone controller without interfering with baseband services.

BACKGROUND OF THE INVENTION

In a conventional phone system, the local telephone loop is formed by and connected directly to a premises phone and the central office of a local exchange carrier (LEC). The premises phone is connected to the local exchange carrier by a local loop of two wires called a wire pair. One of the wires is called T (for tip) and the other is called R (for ring). When the hand set of the premises phone is in its cradle, the weight of the handset holds switch-hook buttons down and open, creating an "on-hook condition". Thus, the circuit between the premises phone and central office is open.

When a premises caller removes the handset of the premises phone from its cradle, the switch hook closes, completing the circuit to the local exchange carrier, creating an "off-hook" condition. The off-hook signal tells the local exchange carrier that a call is desired, and the local exchange carrier returns a dial tone to the premises phone to let the premises caller know that the exchange is ready to accept a telephone number, or "address". At this time, the premises caller enters telephone numbers corresponding to the desired destination address. The local exchange carrier then switches the call into the phone network to complete the call. Some premises phones have speed dialing numbers in which a button can be pushed, activating a calling mechanism in the phone. The appropriate dual-tone multifrequency tones are then generated corresponding to the number stored in memory.

During this time, the premises phone has been connected to the local exchange carrier and a dial tone has been generated from the local exchange carrier to the premises phone. With this system, however, the premises phone is in an off-hook condition, and any dialed numbers are sent directly to the local exchange carrier.

It would be advantageous if local premises equipment could be connected within the premises phone line and connected to the premises phone for generating a dial tone to the premises phone without interfering with the baseband service of the local exchange carrier. This would allow phone dialing and other phone functions without interrupting any baseband service of the local exchange carrier. Thus, a premises customer could issue simple voice commands through the phone, such as "call Bob," as well as instruct the premises equipment to look up various numbers in a stored database. Additionally, the premises equipment could connect to a cable TV POTS service or other service by routing generated signals from the premises phone to the cable TV POTS service.

SUMMARY OF THE INVENTION

The present invention now provides a system and apparatus for generating by a dial tone controller a dial tone within the premises for enhanced phone services. In accordance with the present invention, a premises phone is connected to a phone network via a first communication channel. A dial tone controller is connected between the premises phone and the phone network along the first communication channel. The dial tone controller includes circuitry for generating a dial tone to the premises phone along a second communication channel via the switch extending between the switch and the dial tone controller. The dial tone controller also includes a processor and associated circuitry for receiving and processing signals received from the premises phone.

The dial tone controller generates a dual-tone multifrequency signal (DTMF tones) for establishing communication within the network based on the generated signals received from the premises phone. A switch is operatively connected between the premises phone and the dial tone controller for switching the premises phone from communication with the network along the first communication channel and communication with the dial tone controller along the second communication channel so that the premises phone receives a dial tone from and sends signals to the dial tone controller.

In one aspect of the present invention, the first communication channel comprises a twisted wire pair and a carrier signal extending along the twisted wire pair having a first frequency range. A second communication channel comprises a subcarrier signal extending along the twisted wire pair having a second frequency range. In another aspect of the present invention, the first communication channel comprises a first twisted wire pair and the second communication channel comprises a second twisted wire pair. This second twisted wire pair is sometimes found in some premises, but not always used. Thus, it may be available for use as a second communication channel.

In still another aspect of the invention, the switch is responsive to raising of the premises phone handset from the hook for switching the premises phone to the second communication channel. The dial tone controller can include a database of stored telephone numbers, which can include billing rate data for determining a least cost routing rate for a phone call. When the premises caller dials a long distance phone call, the dial tone controller makes the appropriate database look-up based on the dialed number to determine what possible rates are available. The dial tone controller then dials the more advantageous call (the least cost route), and once the call is completed, the premises switch completes the connection between the premises phone, first communication channel and phone network.

In another aspect of the present invention, the dial tone controller includes voice recognition circuitry for receiving and recognizing voice commands transmitted from the premises phone to the dial tone controller along the second communication channel. The dial tone controller then generates a telephone number, such as "Bob's" number, obtained from the database corresponding to the recognized voice command, such as "call Bob". The dial tone controller also includes circuitry for routing a signal generated from the premises phone to a location separate from the network, such as connecting to a cable TV POTS service.

In another aspect of the present invention, the dial tone controller includes a housing and phone jacks mounted on the housing for connecting the dial tone controller within an existing phone line connected to the premises phone. The switch can be mounted within the housing.

DESCRIPTION OF THE DRAWINGS

The foregoing and other features and advantages of the present invention will be appreciated more fully from the following description, with reference to the accompanying drawings in which.

DETAILED DESCRIPTION OF THE INVENTION

Figure 1:
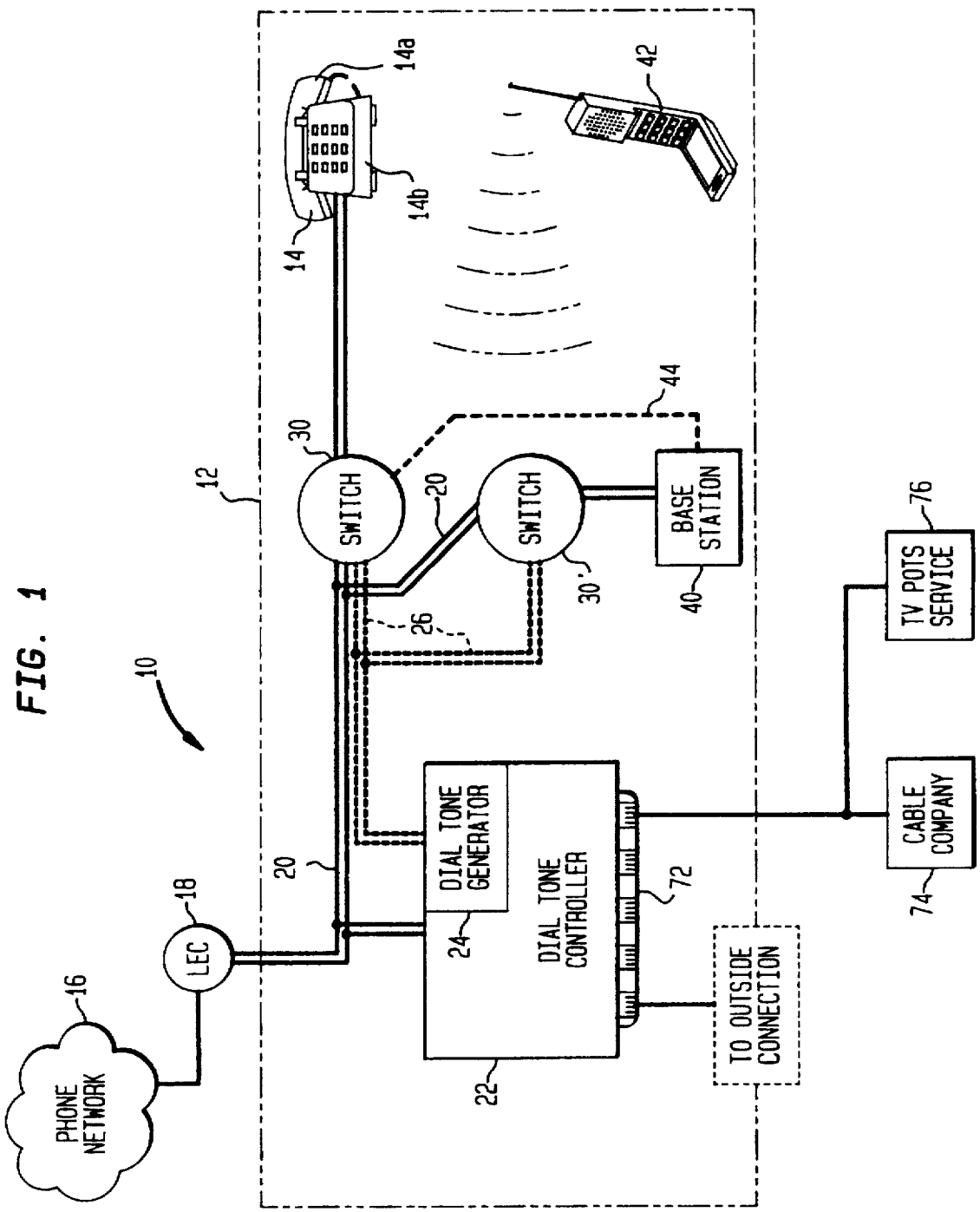
FIG. 1 is an environmental view of the system and apparatus of the present invention that generates within a premises a dial tone to the premises phone for enhanced phone services.

Referring now to FIG. 1, there is illustrated generally at 10 a system of the present invention for generating within a premises, indicated by the dotted line 12, a dial tone for enhanced phone services of a premises phone 14 connected to a phone network 16 by a local exchange carrier 18 and first communication channel 20. The present system is advantageous because it does not interrupt baseband services.

As illustrated, in accordance with the present invention, a dial tone controller, indicated generally at 22, is connected between the premises phone 14 and the phone network 16 along the first communication channel 20. The dial tone controller 22 includes circuitry and system 24 for generating a dial tone to the premises phone along a second communication channel, indicated by the dotted line 26, extending between the switch adjacent the premises phone 14 and the dial tone controller 22. The dial tone controller 22 receives and processes signals received from the premises phone 14 and generates a dual-tone multifrequency signal ("DTMF" tones) for establishing communication within the phone network 16 based on generated signals received from the premises phone 14.

In accordance with the present invention, a switch 30 is operatively connected between the premises phone 14 and the dial tone controller 22 for switching the premises phone 14 from communication with the phone network 16 along the first communication channel 20 and communication with the dial tone controller 22 along the second communication channel 26 via the switch for 1) receiving a dial tone from, and 2) sending signals to, the dial tone controller 22.

In one embodiment of the invention, the first communication channel 20 comprises a twisted wire pair 32 (FIG. 2) and a carrier signal extending along the twisted wire pair of a first frequency range such as the conventional baseband signal from 300 Hertz (Hz) to 3 kilohertz (KHz). The second communication channel 26 can comprise a subcarrier signal extending along the twisted wire pair and having a second frequency range of 300 to 400 kilohertz. In still another embodiment of the invention, the first communication channel 20 can comprise a first twisted wire pair 32 and the second communication channel 26 can comprise a second twisted wire pair, indicated by the twisted dotted lines at 34. In some premises, a second twisted wire pair 34 is a part of the conventional wiring, but remains unused.

As shown in FIG. 1, at least two premises phones can also be used in the system of the present invention and are illustrated in the home premises environment and connected to the local exchange carrier 18 via the first communication channel 20. As illustrated, a base station 40 is connected to the first communication channel 20 and works with a hand-held cordless telephone 42. One switch 30 can be used for the entire premises, as shown in FIG. 1, and by connection 44 to the station 40, or a switch 30' can be used for the other premises phone 14 so that each premises phone can be individually controlled relative to the dial tone controller 22.

Figure 2:
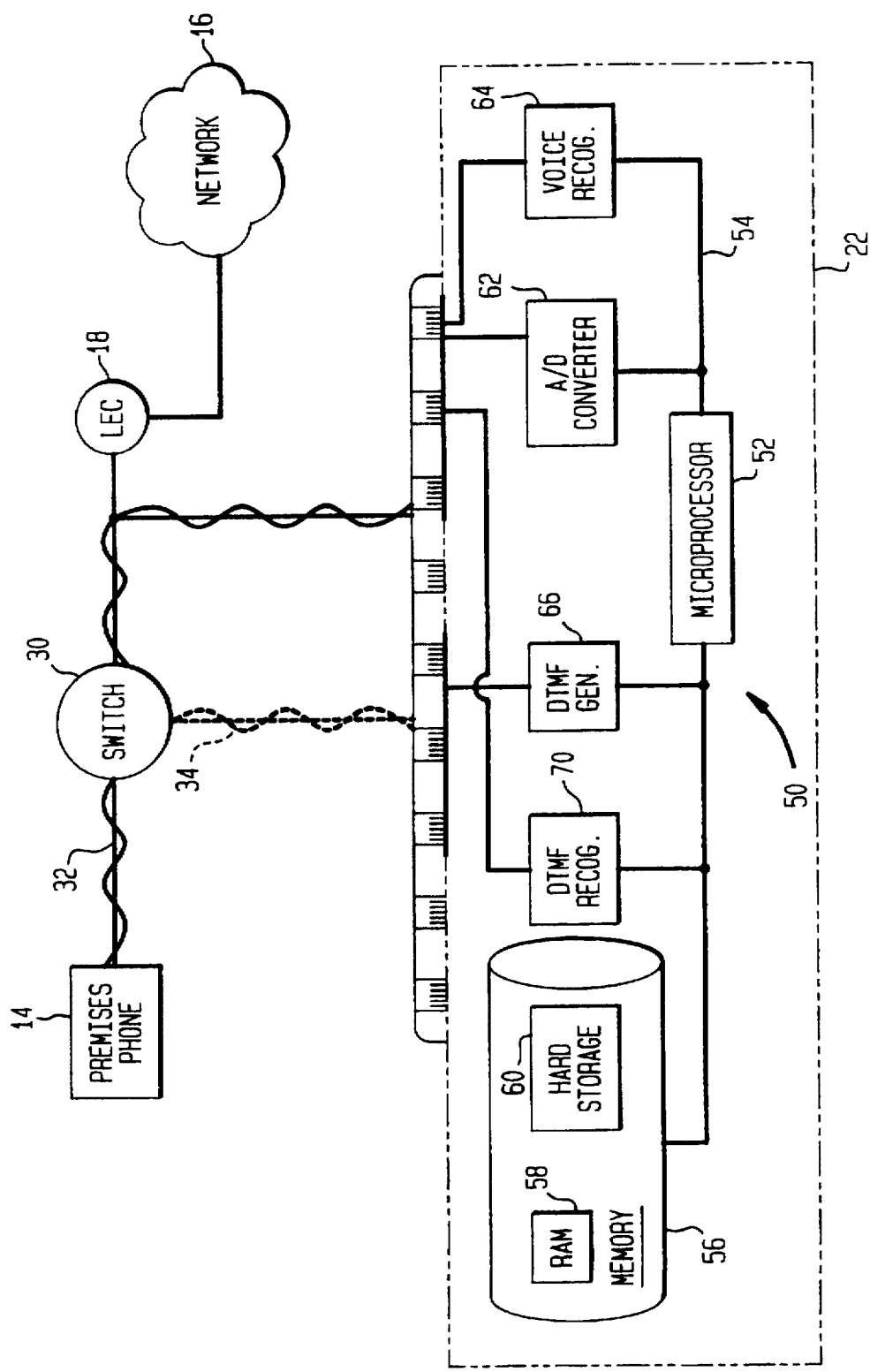
FIG. 2 is a high level block diagram of the dial tone controller of the present invention.

Referring now in greater detail to FIG. 2, different components of the dial tone controller 22 are illustrated in block diagram. As illustrated, the dial tone controller 22 has a main processing system, indicated generally at 50, which includes a microprocessor 52 connected to a digital bus 54. The dial tone controller 22 also includes a memory 56 for storing digital information such as a database of telephone numbers, messages and corresponding names. Part of the memory 56 can be RAM 58 for fast short-term retrieval as well as a hard storage device 60. Both memories 58, 60 are connected to the digital bus 54. Data such as phone numbers and least-cost routing rates can be stored in the memory. Data is read from memory 56 when instructed by the microprocessor 52. An analog-to-digital converter 62 may be included for converting incoming analog signals to digital data for storage in memory 56 and further processing by the microprocessor 52.

The dial tone controller 22 also includes voice recognition circuitry 64 for determining voice commands. This voice recognition circuitry 64 connects to the microprocessor 52 and the communication channels. For example, a premises customer may speak a command into the premises phone such as "call Bob". The voice recognition circuitry 64 analyzes this command and determines, based on the data stored in the database, that the command "call Bob" corresponds to a particular phone number belonging to "Bob". The dial tone controller 22 then calls the number belonging to Bob by means of a dual-tone multifrequency generator 66 and transmits the signal to the phone network 16. Once communication is established to Bob's telephone number, the switch 30 then couples the premises phone 14 to the first communication channel 20 so that communication is established between Bob and the premises customer using the premises phone.

The dial tone controller 22 also can include dual-tone multifrequency detection circuitry 70 connected to the communication channels and bus 54 extending to the network in the premises phone. This circuitry 70 can detect tones used as control signals generated from either a premises phone or network phone to instruct the microprocessor 52 in various functions so as to control processing, memory functions and telephone number retrieval from the database.

The switch 30 can be responsive to raising of the premises phone handset 14a from off its hook 14b (FIG. 1) for switching the premises phone to the second communication channel 26 via the switch. The dial tone controller 22 can also include a standard interface 72 conventionally known to those skilled in the art for connecting the dial tone controller 22 to a cable TV company 74 or a cable TV POTS service 76 so as to route generated signals from the premises phone 14 through a television and cable TV POTS service 76.

Figure 3:
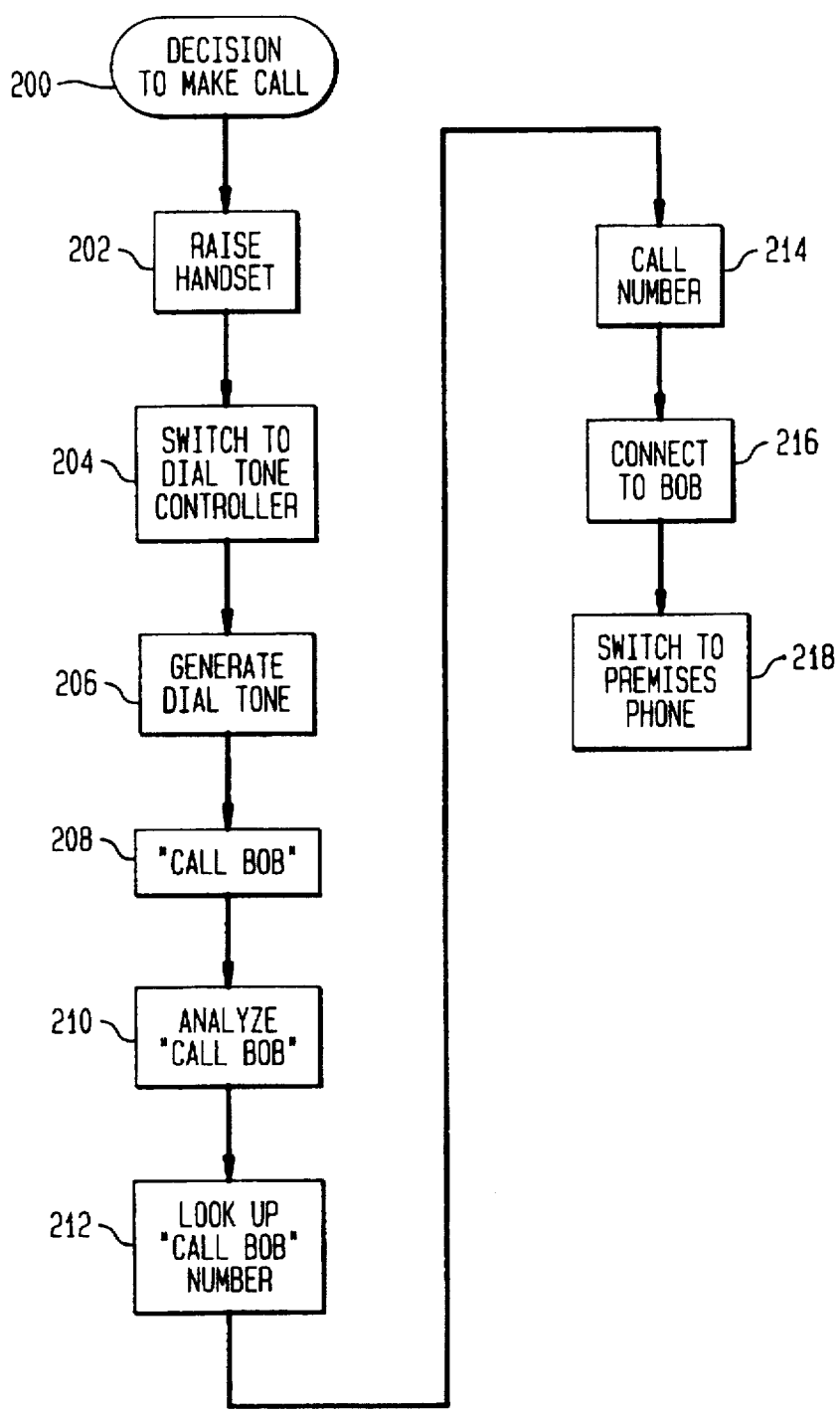
FIG. 3 is a high level flow chart depicting one sequence of possible steps where the dial tone controller generates a dial tone to the premises phone, and the switch then connects the premises phone to the first communication channel and the phone network after an advanced phone service, such as voice recognition, has been accomplished.

The flow chart of FIG. 3 illustrates the various steps of just one aspect of the system for generating within a premises a dial tone for enhanced phone services. For purposes of understanding, the blocks of the flow chart are numbered with numerals starting in the 200 series.

In block 200, the premises customer initially decides to make a telephone call. The premises customer picks the handset 14a from off the premises phone hook 14b (block 202) and the switch 30 automatically couples the premises phone into communication with the dial tone controller (block 204). The dial tone controller 22 and switch 30 determine when the "off-hook" condition occurs. In response, the dial tone controller 22 generates a dial tone to the premises phone 14 (block 206). The premises customer then speaks "call Bob" after receiving the dial tone (block 208). The voice recognition circuitry 64 of the dial tone controller 22 then analyzes the command "call Bob" (block 210) and the microprocessor 52 looks up the corresponding telephone number for the command "call Bob" within the database (block 212). The dial tone controller 22 calls the number (block 214) and connects to Bob (block 216). The switch 30 then couples the premises phone 14 to the phone network 16 via the first communication channel 20 (block 218) once a call completion is made.

It is to be understood that the above description is only one preferred embodiment of the invention. Numerous other arrangements may be devised by one skilled in the art without departing from the spirit of the invention.

That which is claimed is:

1. A system for generating within a premises a dial tone for enhanced phone services comprising a premises phone for receiving analog phone signals from a telephone network, a switch in the premises and operatively connected between the premises phone and a phone network along a first analog communication channel for switching the premises phone from analog communication with the network via the first analog communication channel and into a second analog communication channel extending from the switch, a dial tone controller in the premises and operatively connected to the switch via the second analog communication channel and also to the phone network, said dial tone controller including means for generating a dial tone to the switch along the second analog communication channel so as to produce a dial tone to the premises phone via the switch, said dial tone controller including means for receiving and processing analog signals received from said premises phone via the switch and wherein the second analog communication channel extend from the switch, and including means for generating a dual-tone multifrequency signal to the phone network for establishing communication with said network based on generated analog signals received from said premises phone, wherein said switch then switches communication into said first analog communication channel to allow communication between the premises phone and the phone network after communication is established.

2. A system according to claim 1 wherein said first communication channel comprises a twisted wire pair and a carrier signal extending along said twisted wire pair having a first frequency range, and said second communication channel comprises a subcarrier signal extending along said twisted wire pair having a second frequency range.

3. A system according to claim 1 wherein said first communication channel comprises a first twisted wire pair and said second communication channel comprises a second twisted wire pair.

4. A system according to claim 1 wherein said switch means is responsive to the raising of the premises phone handset from off its hook for switching said premises phone to said second communication channel via the switch.

5. A system according to claim 1 including a database of stored telephone numbers contained in the dial tone controller.

6. A system according to claim 5 wherein said database includes billing rate data for determining a least cost rate for a phone call.

7. A system according to claim 5 wherein said dial tone controller includes voice recognition circuitry for receiving and recognizing voice commands transmitted from said premises phone to said dial tone controller along said second communication channel via the switch and for generating a desired telephone number from the database corresponding to a recognized voice command.

8. A system according to claim 1 including a television and means for connecting to a cable TV POTS service, said dial tone controller including means for routing generated signals from said premises phone through said television and cable TV POTS service.

9. A system according to claim 1 wherein said dial tone controller includes a housing, and phone jacks mounted on the housing for interconnecting said dial tone controller within an existing phone line connecting to said premises phone.

10. A system according to claim 9 wherein said switch is mounted within said housing.

11. An apparatus for generating within a premises a dial tone to a premises phone for enhanced phone services comprising a switch adapted to be operatively connected between a premises phone and a phone network along a first analog communication channel for switching the premises phone from communication with the telephone network via the first analog communication channel and into a second analog communication channel extending from the switch, a dial tone controller operatively connected to the switch via the second analog communication channel and also adapted to be connected to the phone network, said dial tone controller including means for generating a dial tone to the switch along the second analog communication channel so as to produce a dial tone to the premises phone via the switch, said dial tone controller including means for receiving and processing analog signals received from the premises phone via the switch, and including means for generating a dual-tone multifrequency signal to the phone network for establishing communication with said phone network based on generated analog signals received from said premises phone, wherein said switch then switches communication into said first analog communication channel to allow communication between the premises phone and the phone network after communication is established.

12. An apparatus according to claim 11 including a database of stored telephone numbers contained in the dial tone controller.

13. An apparatus according to claim 12 wherein said database includes billing rate data for determining a least cost rate for a phone call.

14. An apparatus according to claim 12 wherein said dial tone controller includes voice recognition circuitry for receiving and recognizing voice commands transmitted from said premises phone to said dial tone controller along said second communication channel and for generating a desired telephone number from the database corresponding to a recognized voice command.

15. An apparatus according to claim 1 wherein said dial tone controller includes a housing, and phone jacks mounted on the housing for interconnecting said dial tone controller within an existing phone line connecting to said premises phone.

16. An apparatus according to claim 15 wherein said switch is mounted within said housing.

* * * * *